United States Patent [19]
Kajiura

[11] Patent Number: 5,871,365
[45] Date of Patent: Feb. 16, 1999

[54] CARD CONNECTOR

[75] Inventor: Motomu Kajiura, Tokyo, Japan

[73] Assignee: Berg Technology, Inc.,, Reno, Nev.

[21] Appl. No.: 52,299

[22] Filed: Mar. 31, 1998

[51] Int. Cl.[6] .................................................. H01R 13/62
[52] U.S. Cl. ................................................................ 439/159
[58] Field of Search ..................................... 439/152–160

[56] References Cited

U.S. PATENT DOCUMENTS

| | | | |
|---|---|---|---|
| 4,570,196 | 2/1986 | Shimaoka et al. ...................... | 360/97 |
| 4,724,310 | 2/1988 | Shimamura et al. .................... | 235/483 |
| 5,197,894 | 3/1993 | Kolke .................................... | 439/159 |
| 5,368,493 | 11/1994 | O'Brien et al. ........................ | 439/160 |
| 5,443,395 | 8/1995 | Wang ..................................... | 439/159 |
| 5,492,481 | 2/1996 | Lewis ..................................... | 439/159 |
| 5,495,391 | 2/1996 | Kirk ....................................... | 361/684 |
| 5,499,925 | 3/1996 | Lwee ..................................... | 439/157 |
| 5,507,658 | 4/1996 | Ho ......................................... | 439/159 |
| 5,536,180 | 7/1996 | Ishida et al. ........................... | 439/159 |
| 5,548,484 | 8/1996 | Kantner ................................. | 361/737 |
| 5,558,527 | 9/1996 | Lin ........................................ | 439/155 |
| 5,575,669 | 11/1996 | Lin et al. ............................... | 439/157 |
| 5,599,197 | 2/1997 | Ishida .................................... | 439/159 |
| 5,730,610 | 3/1998 | Hsia et al. ............................. | 439/157 |

FOREIGN PATENT DOCUMENTS

| | | | |
|---|---|---|---|
| 219670 | 1/1994 | Taiwan ............................. | G06F 1/16 |
| 273312 | 3/1996 | Taiwan ............................. | G06F 1/16 |
| WO 94/27343 | 11/1994 | WIPO ...................................... | 13/62 |

*Primary Examiner*—Neil Abrams
*Assistant Examiner*—Jean F. Duverne
*Attorney, Agent, or Firm*—Daniel J. Long; M. Richard Page

[57] ABSTRACT

An ejecting mechanism-equipped card connector is provided which can be manufactured as a simpler and low cost unit. The card connector has a movable actuator member (74) arranged at an inner end section (52) of a push rod (50) and a cam groove (66) provided in a header body (14a) and operating the actuator member. The cam groove (66) has a drive section (66a) for, when the push rod (50) is moved from an extended position to a pushed-in position of the push rod (50), laterally projecting and guiding the actuator member (74), a latching section (66b) for, when an urging force on the pushed-in rod is released, retracting the actuator member (74) to a position not engageable with the projection (48) to latch it, and a return section (66c) for, when the push rod (50) is urged, unlatching the actuator member (74).

8 Claims, 10 Drawing Sheets

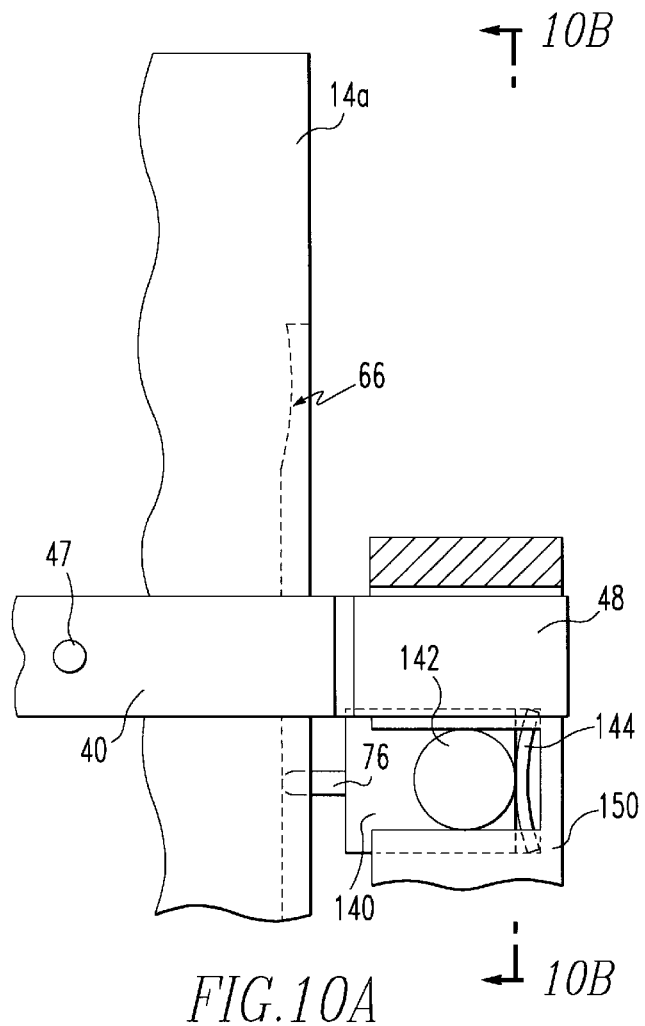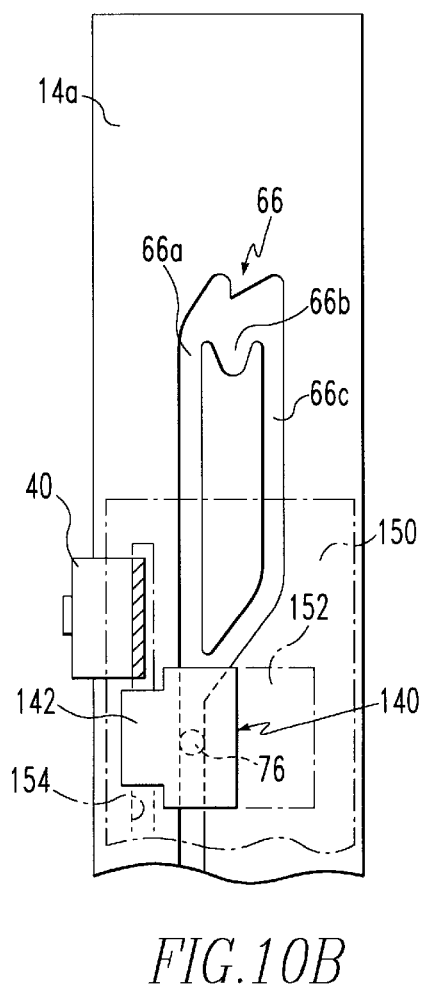
FIG.10A
FIG.10B

CARD CONNECTOR

BACKGROUND OF THE INVENTION

1. Field of the Invention

The present invention relates to a card connector for electrically and mechanically connecting a PC card to an electronic apparatus, such as a computer and, in particular, to an ejecting mechanism-equipped card connector for PC cards.

2. Brief Description of Prior Developments

Japan Patent Application Kokai Publication and U.S. Pat. Nos. 5,558,527 and 5,575,669 disclose an ejecting mechanismequipped card connector whereby, even with the PC card mounted there, a push button for the withdrawal of the PC card is retained in the same position as in a not-mounted state and the push button is projected only when the PC card is withdrawn.

The ejecting mechanism basically includes an operation rod having a push button at an outer end section and spring-urged outwardly, a drive rod for driving a PC card withdrawal plate through a lever, an intermediate member driven under an action of a cam and allowing a connection or disconnection to be made between an outer operation rod and an inner drive rod and a casing for slidably guiding the operation rod and drive rod. A generally heart-like cam groove is formed in the bottom wall of the casing with its projecting end side outward and the recessed side inward. When a cam following pin projected from the operation rod engages with the cam groove and the operation rod is moved, it can be moved in the cam groove in a given direction. In a normal state, the cam follower pin is set in the recess of the heart-like cam groove and the operation rod is retained against the urging force of the spring. As a result, the push button is not greatly projected outside the electronic apparatus, thus preventing an operation error of the push button and not interfering with other devices.

When the PC card is to be withdrawn, the push button is lightly depressed. By doing so, the cam follower pin is pushed out of the recess Ad of the heart-like cam groove. Thereafter, the pin is moved under the urging force of the spring along the groove toward the projecting end side, so that the push button is greatly projected toward an outside of the electronic device. At this time, the intermediate member is driven under a cam action to allow a force to be transmitted from the operation rod to the drive rod. When the greatly outwardly projected push rod is pushed, an urging force acting on the push button is transmitted from the operation rod to the drive rod through the intermediate member, thus driving the lever and PC card withdrawal plate. Since the operation rod and drive rod are guided along the inner surface of the casing, it is not folded at an abutting section to the intermediate member. Together with the movement of the PC card withdrawal plate, the PC card is also moved and withdrawn out of the card connector. When an urging force on the push button is released after the withdrawal of the PC card, the cam follower pin of the operation rod is retained in the recess of the heart-like cam. The intermediate member enables the drive rod and PC card withdrawal plate to be freely moved, irrespective of the position of the operation rod, without interfering with the operation rod.

However, the conventional ejecting mechanism requires more component parts since the operation rod and drive rod, together with the intermediate member, are contained in the casing and guided along the inner surface of the casing. Therefore, there is a growing demand for a card connector answering the recent tendency of the electronic devices to become smaller and smaller in size and higher and higher in function.

It is accordingly the object of the present invention to provide an ejecting mechanism-equipped card connector which is achieved, taking the above into consideration, and can be manufactured as a simpler and low-cost unit.

SUMMARY OF THE INVENTION

In order to achieve the above-mentioned object of the present invention there is provided a PC card connector equipped with an ejecting mechanism, comprising:

a header section having an array of terminal pins connected to a PC card;

an ejecting plate having engaging sections for engaging with the PC card and guided along an insertion/withdrawal direction of the PC card;

a link member having a coupling section so coupled to the ejecting plate as to be swingable, a support section swingably supported at the header section in a spaced-apart position from the coupling section, and a projection projecting toward the side of the header section;

a push rod having an inner end section disposed adjacent to the header section and an outer end section spaced apart from the header section and adapted to receive an urging force, whereby, when the outer end section is moved from an outwardly extended position spaced apart from the header section to an inwardly pushed-in position near to the header section, the ejecting plate is moved in a PC card withdrawal direction through the link member;

urging means for urging the push rod toward the outwardly extended position; and an operation device whereby, when the push rod is moved from the extended position to the pushed-in position by the urging force from the outer end section, the ejecting plate is driven in the PC card withdrawal direction through the link member, when the urging force is released with the push rod set in the pushed-in position, the outer end section latches the push rod to a retained position somewhat more on an outer side than the pushed-in position, and, when the push rod in the retained position receives the urging force through the outer end section, the push rod is unlatched so that the push rod is returned to the extended position, in which the operation device has a movable actuator member disposed at the inner end section of the push rod and a cam provided at the header section and adapted to operate the actuator member and the cam has a drive section for, when the push rod is moved from the extended position to the pushed-in position, projecting and guiding the actuator member to a projected position engageable with the projection of the link member, a latching section for, when the push rod is situated in the pushed-in position and the urging force is released, retracting the actuator member to a position not engageable with the projection to latch the actuator member and prevent the push rod from being returned to the extended position, and a return section for, when the push rod in the retained is position receives the urging force through the outer end section, unlatching the actuator member to move and guide the actuator member to the retracted position.

In the card connector of the present invention, the push rod containing the actuator member is brought by the actuator member into direct engagement with the link member to move the ejecting plate through the link member. It is, therefore, possible to obtain a compact and low-cost card connector of less component parts and to efficiently withdraw the PC card through a direct action of an urging force on the push rod from the push rod to the link member.

The header section has a side projection situated on the projecting side of the link member's projection and providing the cam and a guide rail provided at the side projection and guiding the inner end section of the push rod along an insertion/withdrawal direction, the inner end section of the push rod has a hollow slider slidable along the guide rail and arranged in an superimposed relation and the actuator member is mounted in the slider and projectable out of an opening in that side wall of the slider facing the header section. Since, in this case, the guide rail and cam are provided at the header section, it is possible to assemble the card connector in a very simply and highly accurate way.

The push rod may be so formed as to receive an urging force on the outer end of the operation arm coupled to one end of the slider.

The card connector further comprises:
a connector frame having the header section and a pair of opposed arm sections extending from both side ends of the header section and guiding the side edge of the PC card along an insertion/withdrawal direction of the PC card;
a plurality of mount brackets, each, having a body section fitted over the connector frame, a stand-off section extending from the body section and retaining a predetermined distance between the connector frame and a printed circuit board, and a coupling section extending from the stand-off section into an opening of the printed circuit board and fastened by fastening means from an opposite side of the printed circuit board, and fixing the connector frame to the printed circuit board, wherein a latch hole is provided in one of the body of the mount bracket and connector frame and an associated retaining claw is provided on the other and, through the engagement of the retaining claw with the latch hole, the mount bracket fixes its body section to the connector frame, and
in an inserted position of the mount bracket with the stand-off section set in a corresponding opposite side and in a non-inverted position, the coupling section is set in the same corresponding position along a width direction of the PC card and insertion/withdrawal direction of the PC card. Even if, in this case, the mount bracket is placed on an opposite position, the coupling section of the respective mount bracket is located in the same corresponding position and it is possible to simply mount the mount bracket on any side of the printed circuit board simply by changing the direction of the mount bracket.

The arm sections can be mounted on any side of the PC card by making them identical in structure to each other.

Further, the cam may be located in a plane substantially orthogonal to a plane in which the ejecting plate is moved and the drive section of the cam may be so formed as to project and guide the actuator member toward a direction substantial orthogonal to the insertion/withdrawal direction of the PC card. In this case, the header section can be narrowed in width and made compact.

Further, the cam may have a groove in the side projection and an actuator member may have a cam follower pin guided along the groove and spring-urged toward the side projection and, in this case, the cam follower pin is set in contact with the bottom wall of the groove. Even if the card connector is placed in any given state, the actuator member is cam-driven positively.

BRIEF DESCRIPTION OF THE DRAWINGS

FIG. 10 is an explanatory view showing part of the header section of a card connector according to another embodiment of the present invention.

DETAILED DESCRIPTION OF THE PREFERRED EMBODIMENT

The embodiment of the present invention will be explained below with reference to the accompanying drawing.

FIGS. 1 to 9 show a card connector 10 according to a preferred embodiment of the present invention. The card connector 10 of the present invention is screwed to a printed circuit board P (see FIG. 8).

Figure 1:
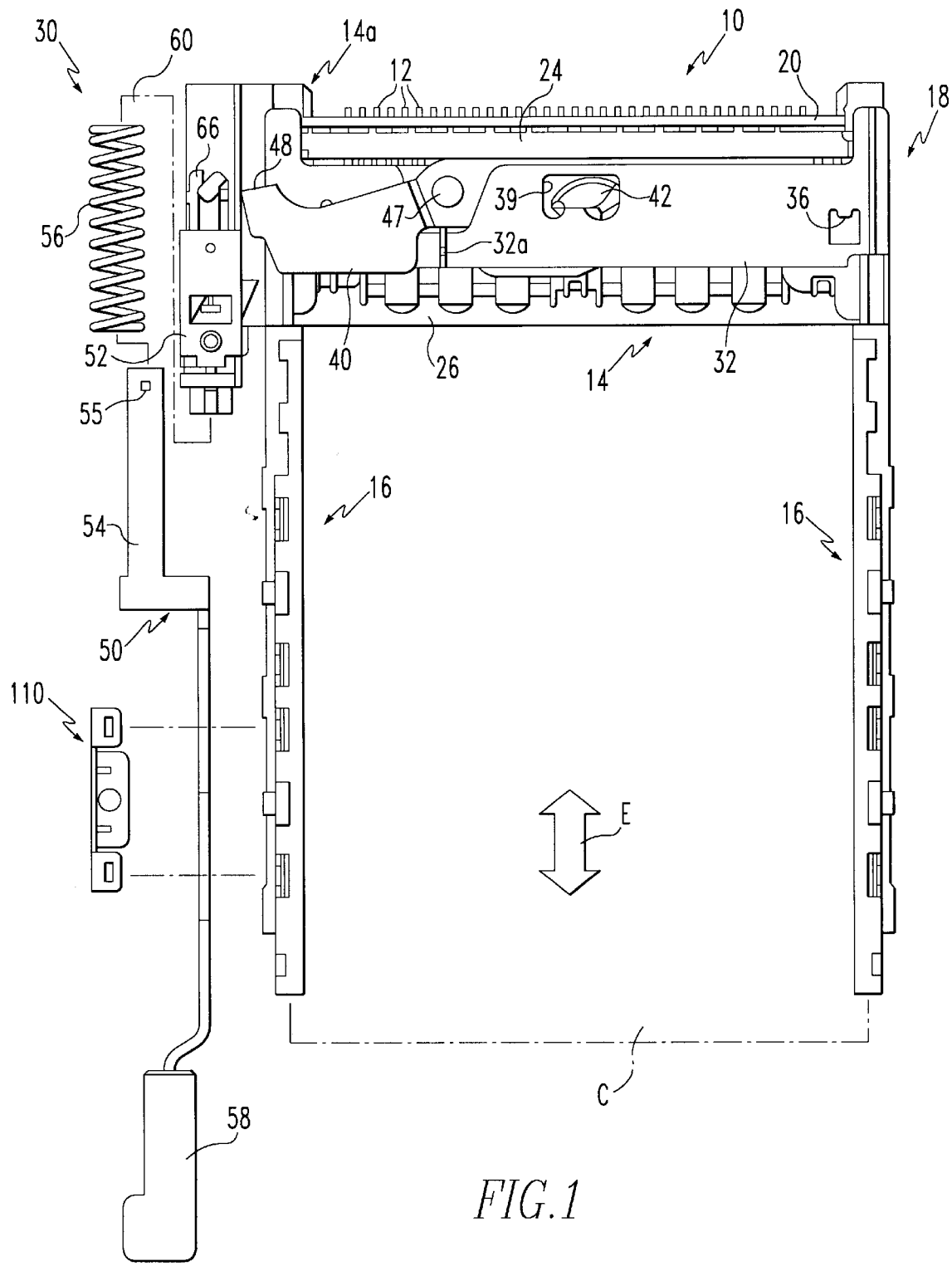
FIG. 1 is a diagrammatic, explanatory view, partly in exploded form, showing a card connector according to a preferred embodiment of the present invention.

As shown in FIG. 1, the card connector 10 includes a connector comprising a header section 14 having a plurality of terminal pins 12 arranged in a width direction and adapted to be connected to a PC card C and a pair of opposed arm sections 16 one at each side end of the header section.

Figure 8A:
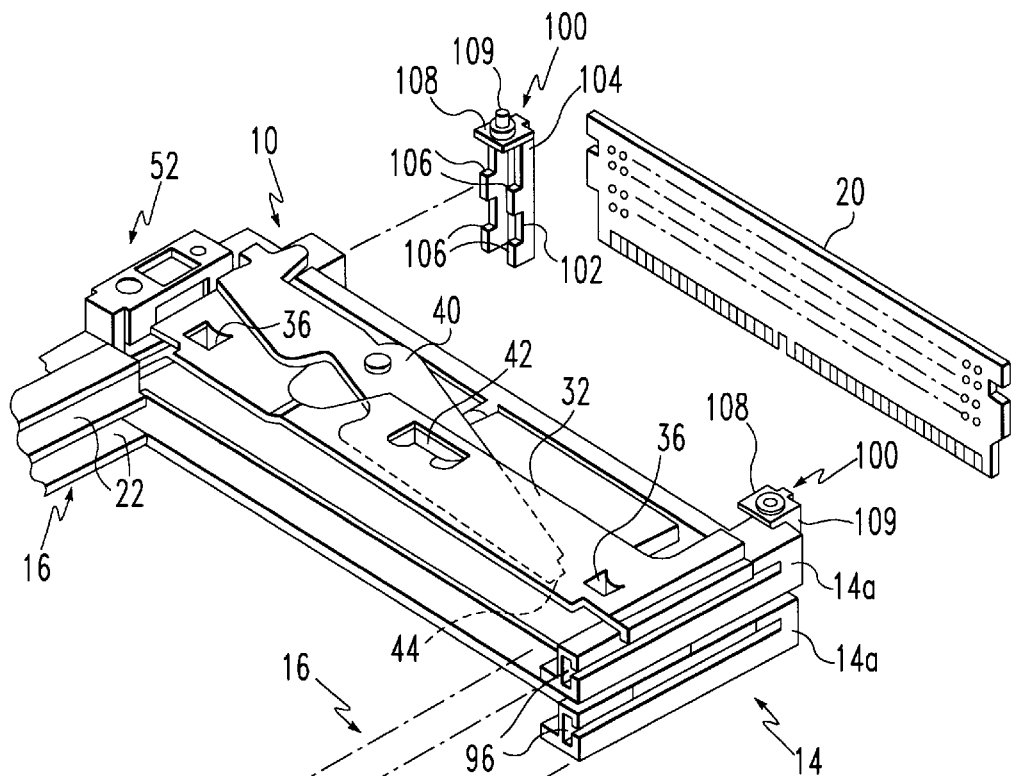
FIG. 8 is an explanatory view showing a state in which the assembled card connector is attached to a printed circuit board, FIG. 8(A) being a view showing, together with a mount bracket, part of the card connector and FIG. 8(B) a view showing a relation between the printed circuit board and the mount bracket.
Figure 8A:
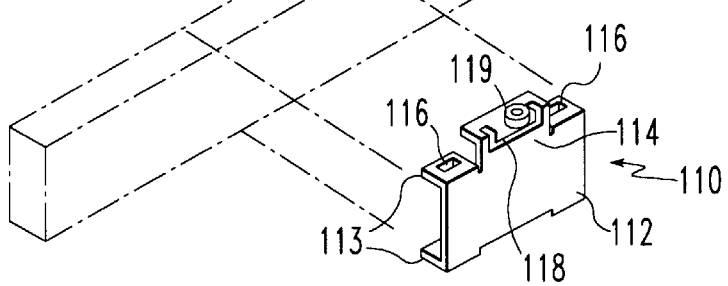

At the header section 14, two header bodies 14a of the same structure made of an insulating material are so arranged as to be stacked in a thickness direction of a PC card C (see FIG. 8). These header bodies 14a have forward end sides of the terminal pins 12 inserted via through holes 28a (see FIG. 4) in a small printed circuit board 20 and soldered to the through holes. Further, the read end sides of the header bodies 14a are integrally coupled by the a=sections 16 at both side ends. As a result, the respective header bodies 14a, together with the small printed circuit board 20 and arms 16, provide a rigid integral structure. The respective sections 16 have mutually the same structure and are arranged in guide grooves 22 (see FIG. 8) in an opposed relation. Those PC cards C of various kinds of thicknesses have their side edge portions guided in guide grooves 22 and can be moved along an insertion/withdrawal direction E. Reference numeral 24 denotes a shield plate and 26, a card bus shield in contact with the surface of the PC card C in which case ground pins projected at predetermined intervals are inserted through the through holes in the small printed circuit board 20 and soldered there.

Figure 2A:
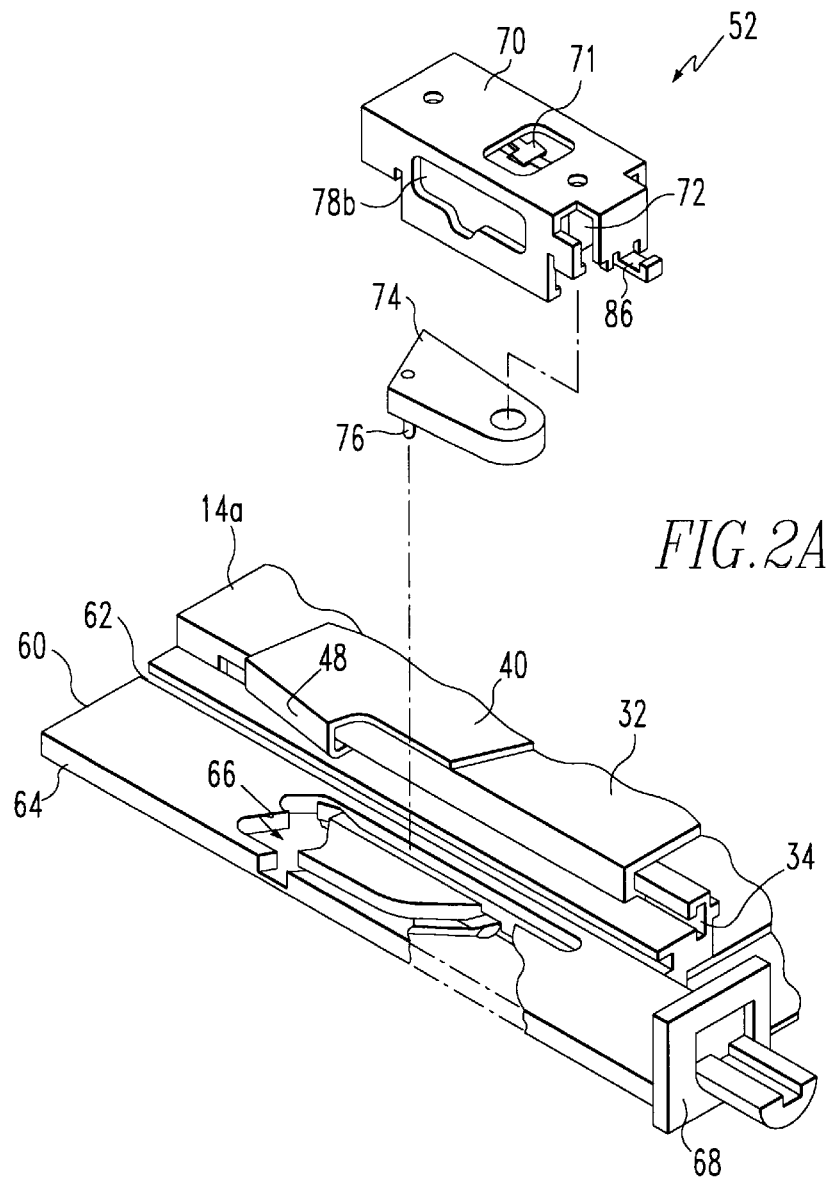
FIG. 2 is a perspective view diagrammatically showing part of a header section in the card connector in FIG. 1, FIG. 2(A) being an exploded view and FIG. 2(B) a view as seen from a different direction of an actuator member.
Figure 2B:
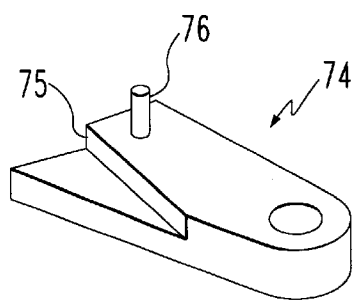
Figure 3A:
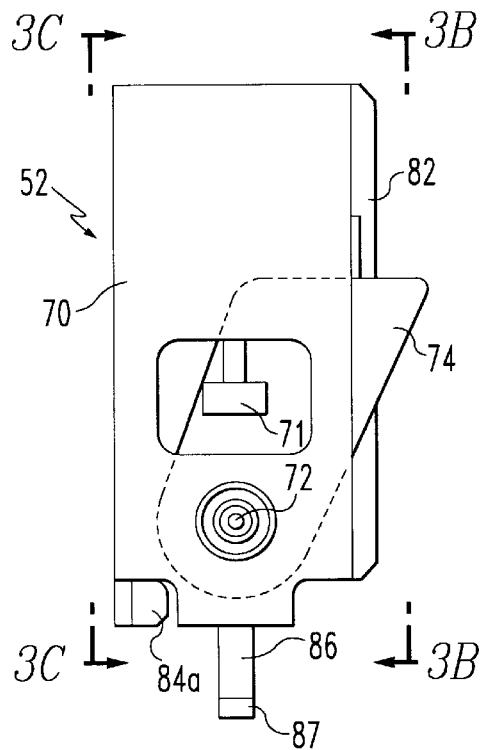
FIGS. 3(A) to 3(D) are explanatory views showing an inner end section of a push rod of the card connector in FIG. 1, FIG. 3(A) being a plan view, FIG. 3(B) a view as taken along line B—B in FIG. 3(A), FIG. 3(C) a view as taken along line C—C in FIG. 3(A) and FIG. 3(D) a view as seen from an outer side.
Figure 3B:
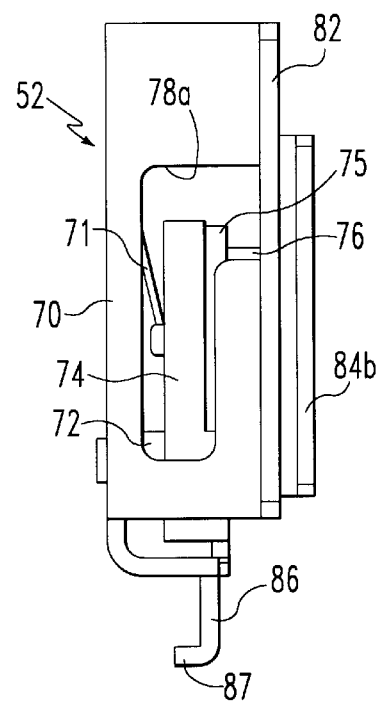
Figure 3C:
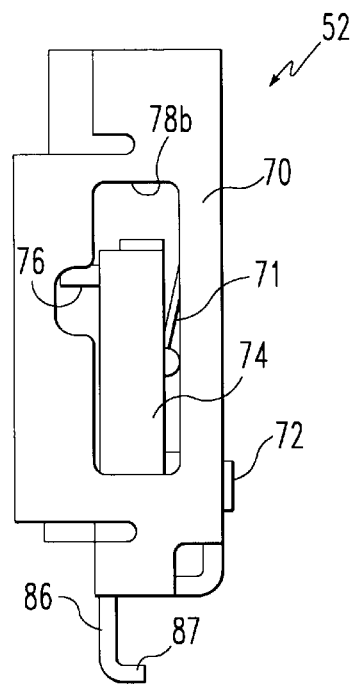
Figure 3D:
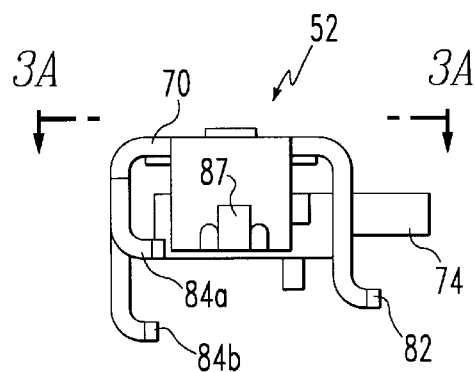

An ejecting mechanism 30 has an ejecting plate 32 formed of a thin metal plate to allow the PC card C to be withdrawn out of the header section 14. The ejecting plate 32 are so mounted as to be slidable in both side edge portions of the header bodies 14a. In the present embodiment, as shown in FIG. 2, a guide groove 34 is formed in the side edge portion of the header body 14a and a hooklike claw section is so set on both the side edge portions as to be fitted in the guide groove 34 to allow the PC card C to be guided along the insertion/withdrawal direction E of the PC card C.

Figure 5:
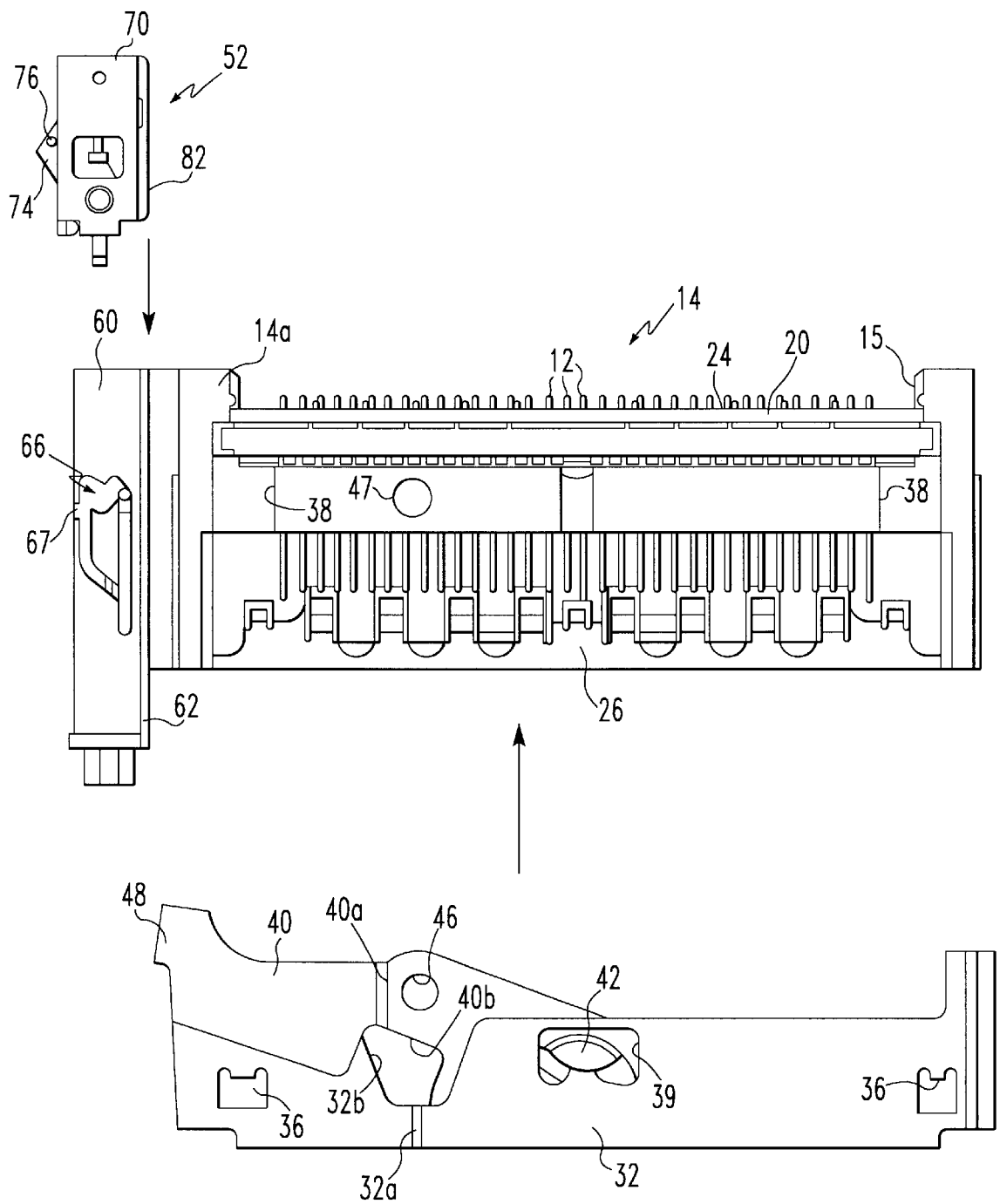
FIG. 5 is an explanatory view showing a state in which a link member an/ejecting plate of an ejecting mechanism and an inner end section of a push rod are attached to an assembled header section in FIG. 4.

As shown in FIGS. 1 and 5, the ejecting plate 32 is so formed as to have a stepped structure at its whole area. From the ejecting plate portion at each side of a step section 32a a corresponding one of a pair of engaging sections 36 is projected toward the header body 14a side and adapted to be set in engagement with the end face of the PC card C. Near to each side edge of the ejecting plate, the engaging sections 36 are so formed as to be bent from the plate material of the ejecting plate 32 and, when the ejecting plate 32 is mounted on the header body 14a, are received in a corresponding receiving groove 38 in the header body 14a. Near to the step section 32a of the ejecting plate 32 a recess 32b for preventing an interference with a link member 40 is provided and, at a substantially middle of the ejecting plate, a substantially rectangular opening 39 is provided so as to allow a swingable motion of the link member 40.

The link member 40 is made of a thin metal plate and has a stepped structure oppositely facing the ejecting plate. In the neighborhood of a step section 40a of the link member 40 a recess 40b is formed so as to engage with the step section 32a of the ejecting plate 32 and prevent an interference with the ejecting plate 32. With step sections 40a and 32a set in the associated recesses 32b and 40b, those plate portions on both the sides of the step sections 40b and 32b are overlapped in a substantially parallel state.

A projection 42 is projected from a portion of the link member 40 disposed between the ejecting plate 32 and the header body 14a. Further, at the forward end portion of the link member, an engaging section 44 (see FIG. 8) is so provided as to be projected on the header body 14a side opposite to the projection 42 side. The projection 42 is received in the opening 39 in the ejecting plate 32 and provides a coupling section swingably connected to the link member 40. The projection 42 is so formed as to have a curved outer peripheral surface to be abutted against the inner edge of the opening 39. It is, therefore, possible to smoothly transmit a force between the ejecting plate 32 and the link member 40. Further, when the ejecting plate 32 is moved, via the coupling section, in the withdrawal direction, the engaging section 44 is moved more outwardly than the engaging section 36 of the ejecting plate 32, so that the PC card is withdrawn by a greater extent.

An opening 46 is provided as a support section near to the step portion 40a of the link member 40. A support shaft section 47 is projected via the opening 46 out of the header body 14a and so supported as to be swingable. As a support section of the link member, a convexly curved section may be provided at the edge portion of the forward end side instead of forming such opening 46 in the link member 40, so that the convexly curved section is supported to allow it to be swingable by a wall portion made erect from the header body 14a. In this case, the support shaft section 47 is omitted.

At the outer side of the link member 40, a projection 48 is projected outwardly of the header body 14a. A push rod 50 of the ejecting mechanism 30 drives the link member 40 through the projection 48.

The push rod 50 comprises an inner end section 52 engaging with the projection 48 of the link member 40, an operation arm 54 removably connected to the inner end section 52, and a coil spring 56 for outwardly urging the push rod. The operation arm 54 is provided by bending a metal plate and has an outer end with a push button 58 mounted thereon. By pushing the push button 58 inwardly, the push rod is slidably moved along the arm section 16.

Even with the PC card C set in the connector 10, the push button 58 is arranged in the same position as in a case where the PC card is not inserted and an operation device is provided in the ejecting mechanism so that the push button 58 is projected only when the PC card C is withdrawn.

As shown in FIGS. 1 to 3, the operation device of the present embodiment comprises the inner end section 52 of the push rod 50 and a side projection 60 of the header body 14a. As shown in FIGS. 2 and 3, the side projection 60 has a guide groove 62 provided as a guide rail on the header body 14a side and a side edge section 64 present on an opposite side of the guide groove 62 and guides an inner end section 52 of the push rod along these parallel guide rails 62, 64. Further, the side projection 60 includes a cam groove 66 guiding the inner end section 52 in its upper surface side and a stopper 68 provided at the end of the arm section 16 side so as to support the coil spring 56 and latch the inner end section 52 against an urging force of the coil spring 56.

The inner end section 52 of the push rod 50 has a slider 70 disposed over the cam groove 66 in a superimposed relation and slidable along the guide rails 62, 64 and an actuator member 74 swingably fitted over a support pin 72 projecting into the slider. The actuator member 74 has a cam follower pin 76 engaging with the cam groove 66 and has a stepped section such that the cam follower pin projecting side has a stopper face 75. The actuator member 74 is urged toward the side projection 60 by a spring 71 fixed in place in the slider 70. When the slider 70 is moved, the cam follower pin 76 slides along the bottom surface of the cam groove 66.

As shown in FIG. 3 in particular, the slider 70 is preferably formed by bending a metal sheet. The slider 70 has a slide edge section 82 loosely fitted in the guide rail, that is, the guide groove 62, on the header body 14a side and slide edge sections 84a, 84b loosely sandwiched by the guide rail, that is, the side edge section 64, on the opposite side. Further, an opening 78a is provided in a side wall portion of the slider near to the header body 14a to have the forward end of the actuator member 74 projected therein. The forward end of the actuator member 74 projecting from the opening 78a engages with the projection 48 of the link member 40. At this time, the stopper face 75 of the actuator member 74 engages with the side wall of the slider 70 to prevent the rotation of the actuator member 74 and projecting of it. An opening 78b is also provided in the side wall on the opposite side of the slider 70 and, when the inner end section 52 is mounted on the side projection 60, the actuator member 74 is swung in a lateral direction to prevent the cam follower pin 76 from interfering with the side projection 60.

A coupling arm 86 extends from the slider 70 toward the operation rod 54 side (FIG. 1) and a latch piece 87 is formed on the forward end of the coupling arm 86 to be fitted in a latch hole 55 in the operation rod 54. It is preferred that the coupling arm 86 and latch piece 87 be located near to the side projection 60.

Figure 4:
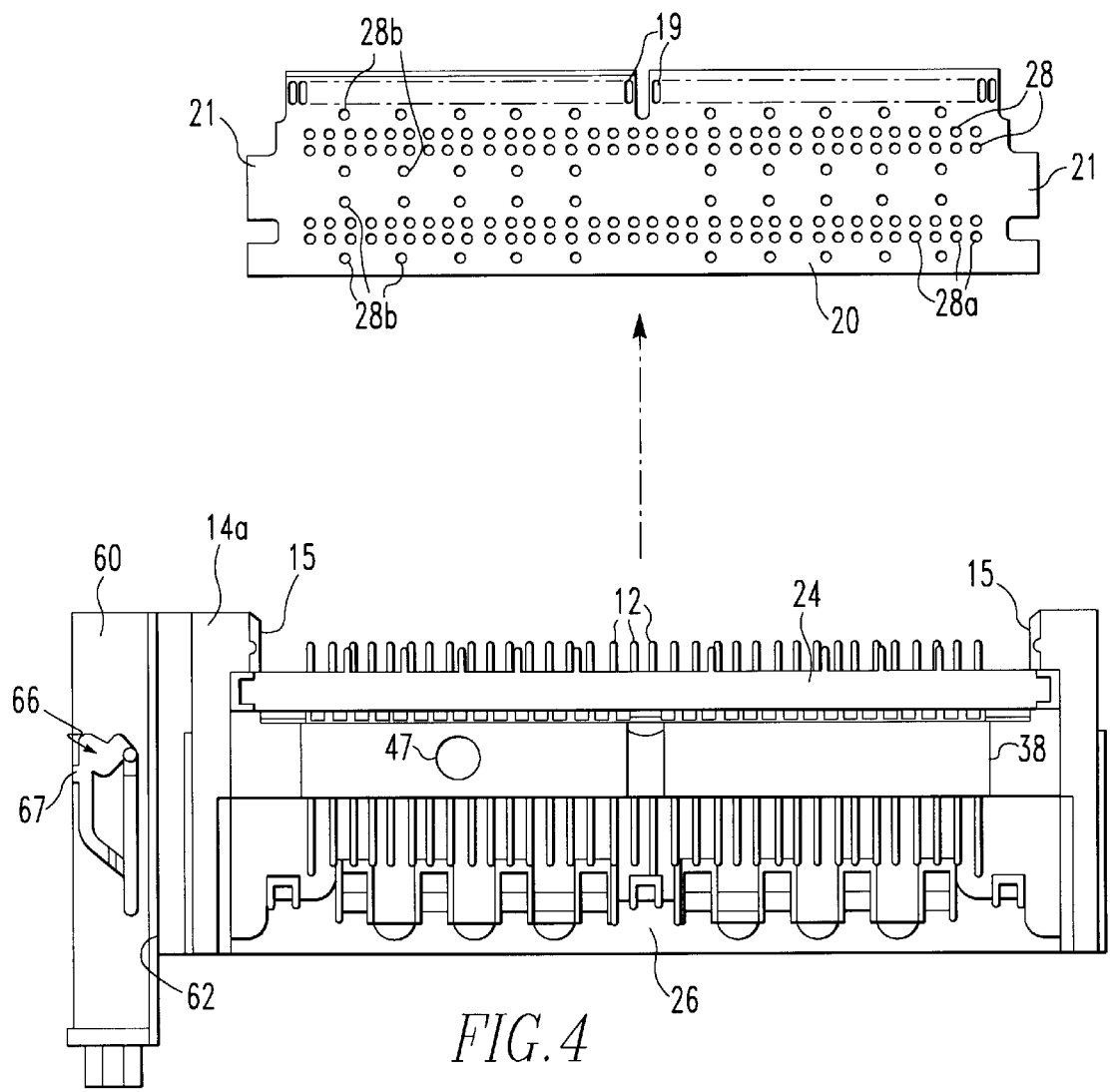
FIG. 4 is an explanatory view showing a state in which a header body of a card connector is mounted on a small printed circuit board.

FIGS. 4 to 7 diagrammatically show an assembling procedure of the card connector 10. As shown in FIG. 4, the upper or the lower side header body 14a is mounted at the shield plate 24 and cover bus shield 26. And the small printed circuit board 20 and ejecting mechanism 30 are mounted there.

The small printed circuit board 20 has the through holes arrayed to receive the terminal pins 12 of the two arrays of the respective header bodies 14a. As those upper and lower positions of the small printed circuit board 20 with the two arrays of the through holes 28 formed therebetween in the insertion direction of the insertion pin 12, that is, in the thickness direction of the PC card C, the through holes 28b are arrayed at predetermined distances to receive ground pins of the shield plate 24 and card bus shield 26. In order to correspond to the header bodies 14a, four arrays of small holes are formed in the small printed circuit board 20. The four arrays of the through holes are electrically connected to conductive pads 19 formed at a different surface whereby the conductive pads 19 arranged among the edge of each surface of the small printed circuit board 20 are electrically connected to the header body's terminal pins 12 and ground pins.

A projection piece 21 is projected from each side end of the small printed circuit board 20 and serves as a guide for allowing it to be guided along the ridge 15 provided on the header body 14a. Each projection piece also serves to retain the mutually superimposed header bodies 14a at a predetermined distance. With the small printed circuit board 20 fully attached to the header bodies 14a, the projection piece 21 is latched by a small projection, not shown, provided on the ridge 15 and held in place.

As shown in FIG. 5, after the lower-side header body 14a and thus formed small printed circuit board 20 are attached to each other, the ejecting plate 32 of the ejecting mechanism 30 and link member 40 are mounted to the header body 14a and the inner end section 52 of the push rod is mounted on the side projection 60.

By fitting the opening 46 of the link member 40 over the support shaft section 47 of the header body 14a, the link member 40 is freely swung around the support shaft section 47, so that it is possible to move the ejecting plate 32 in the insertion/withdrawal direction E of the PC card C through the coupling section, that is, through the projection 42 and opening 39. The plate section with the projection 42 provided thereon is disposed between the ejecting plate 32 and the header body 14a. Since the ejecting plate 32 has its hook-like claw section fitted in the guide groove 34 (FIG. 2), the link member 40 is prevented from falling off from the support shaft section 47.

On the other hand, the inner end section 52 is mounted on the side projection 60 with the actuator member 74 mounted in the slider 70 and the cam follower pin 76 projected from the opening 78b. When the slide edge portions 82, 84a, 84b (FIG. 2) slide along the guide rails 62, 64 and the support pin 76 aligns with the cutout section 67 of the cam groove 66, the support pin 76 is fitted in the cam groove 66 via the cutout section 67.

After the lower-side header body 14a, ejecting plate 32, link member 40 and slider 70 are attached to the small printed circuit board 20, the upper-side header body 14a is attached in the same procedure as set out above.

Thereafter, the respective terminal pins 12 and ground pins are soldered to the small printed circuit board 20. At this time, it is preferable that a temporary setting means be provided on the opposite side of the small printed circuit board 20 so as to support the two stacked header bodies. In the header section 14 with the small printed circuit board 20 attached thereto, the terminal pins 12 and ground pins are inserted into associated through holes of the small printed circuit board 20 and soldered there so that the respective header body 14a is firmly coupled to the small printed circuit board 20. The upper and lower stacked header bodies 14a are retained at a predetermined distance by the projection piece 34 of the small printed circuit board 20. The respective header body 14a is coupled by the arm sections 16 at the opposite side of the small printed circuit board 20.

The arm sections 16 mounted on the side ends of the respective header body 14a have the same structure and, therefore, one of them will be explained below.

Figure 6A:
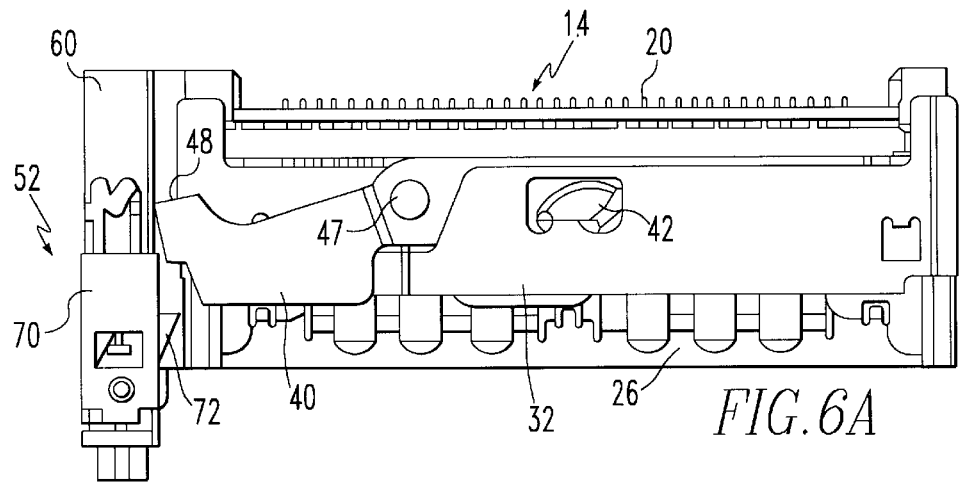
FIG. 6 is an explanatory view for explaining a state in which an arm section is mounted on an assembled head section, FIG. 6(A) being a view of the header section, FIG. 6(B) a plan view of the arm section and FIG. 6(C) a view as sen from a C—C direction in FIG. 6(B)
Figure 6B:
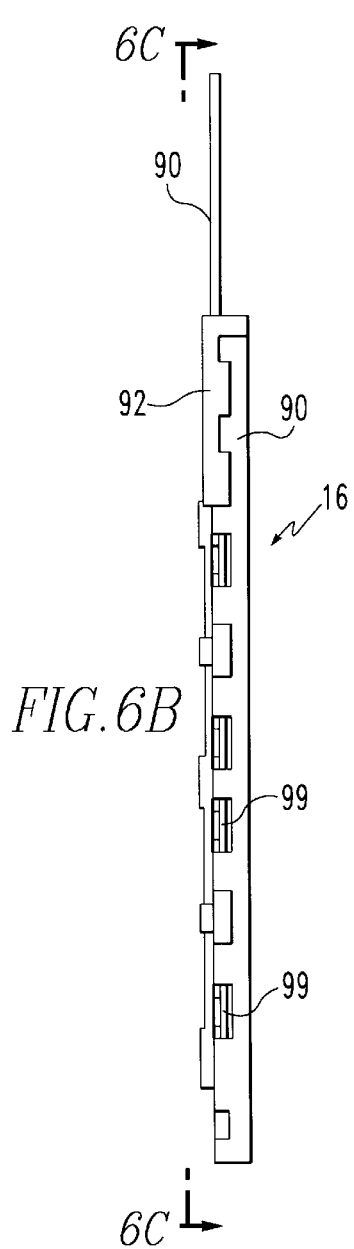
Figure 6C:
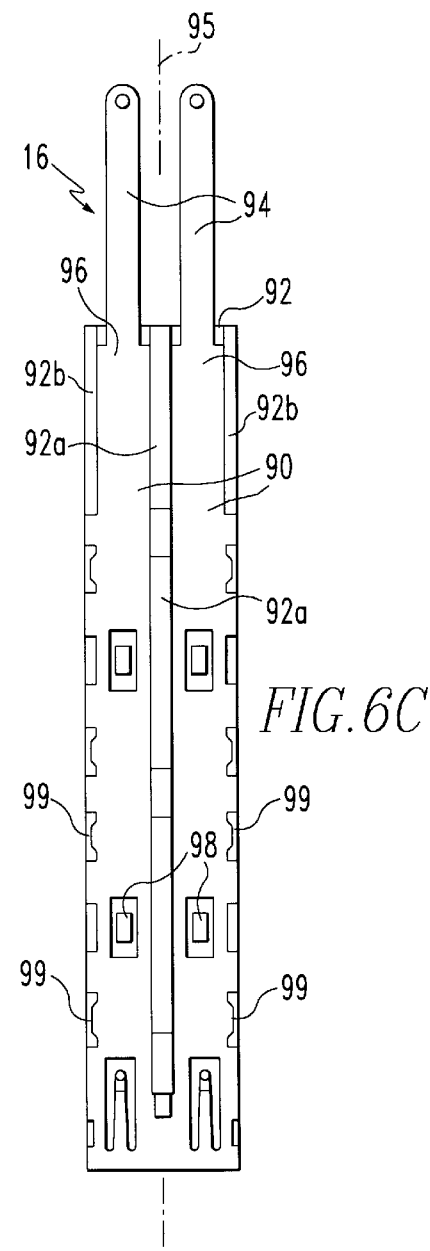

As shown in FIG. 6, the respective arm section 16 is of such an integral structure with a core material 90 and resin material 92 formed by an injection-molding, the core material being formed by bending a metal sheet. By the resin material 92 the guide groove 22 (see FIG. 8) is formed to guide the PC card C. The arm section 16 has two joining metal arms 94 extending from its forward end in a substantially parallel way. By inserting these joining arms 94 into joining holes 96 (see FIG. 8) in the ends of the header body 14a the mutually stacked two header bodies 14a can be joined at the opposite side of the small printed circuit board 20. Small projections or recesses may be provided on the surface portion of these joining arms 94 so as to obtain a greater frictional force on the resin material of the header body 14a. As clearly seen from FIG. 6(C), the arm section 16 has a symmetric shape with a longitudinal axis 95 as a center and can be mounted on either side end of the header section 14.

The arm section 16 is such that the center resin material 92a and side resin materials 92b on both side of the center resin material are more projected on the outer side than the core material 90 and two substantially parallel recesses 96 (FIG. 6(C)) are provided between these resin materials 92a and 92b. The operation arm 54 of the push rod 50 shown in FIG. 1 is disposed in the recess 96 and can be slidably moved in the recess 96. It is desirable to provide an opening, not shown, and receive, therein, a stopper 98 projected from the arm section 16. By the stopper 98 it is possible to restrict a moving limit of the push rod 50 and prevent any undue force on the actuator member 74, etc., of the inner end section 52.

Figure 7:
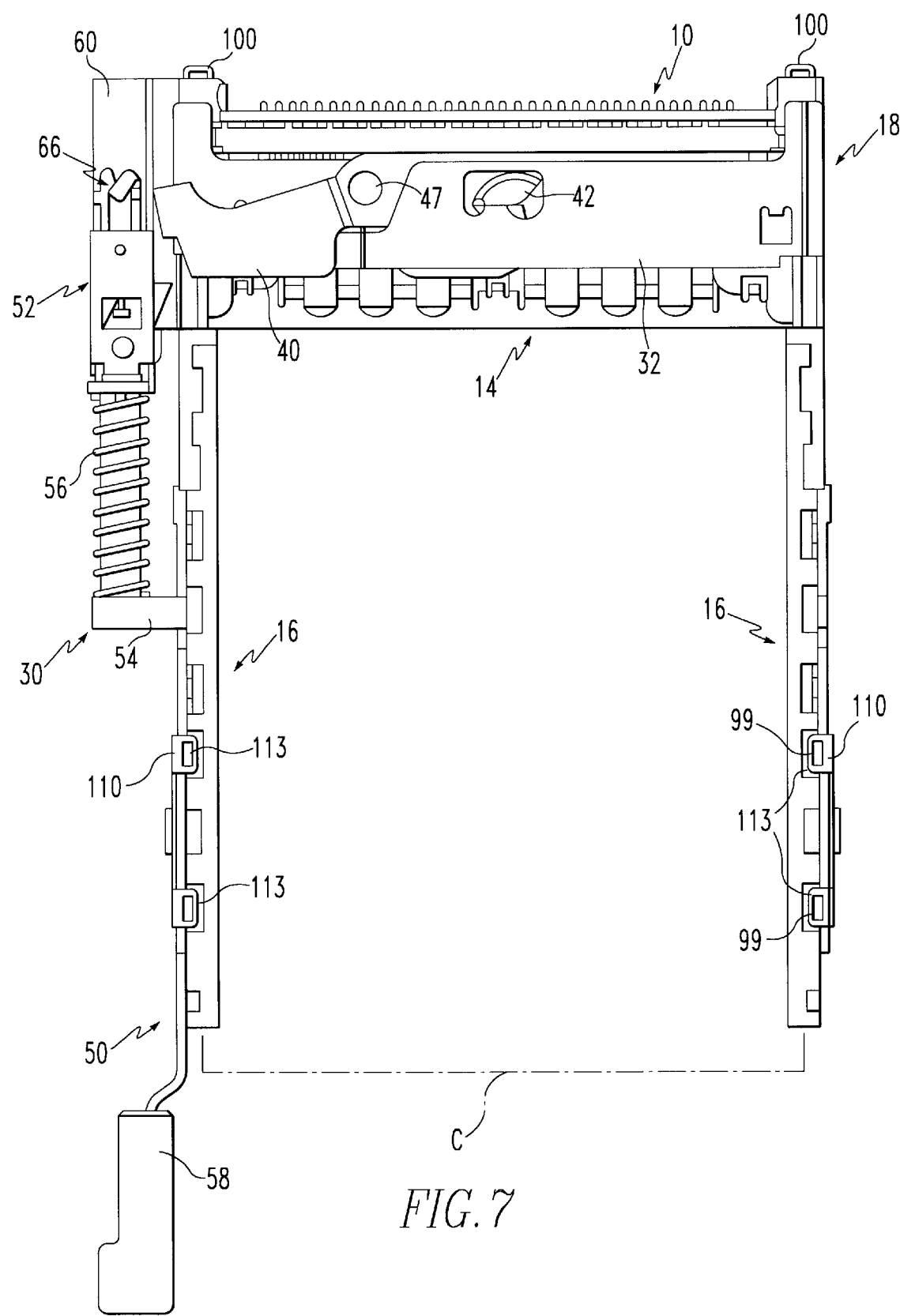
FIG. 7 is an explanatory view showing an assembled card connector.

FIG. 7 shows a fully assembled state in which the arm section 16 is mounted on the arm section 16 and the push rod 50 is mounted on a one-side arm section 16. The card connector 10 in the assembled state is mounted on the printed circuit board P by one pair of mount brackets 100 mounted on the header section 14 and two pairs of mount brackets 110 mounted on the arm sections 16.

FIG. 8 shows mount brackets 100, 110 for fixing the card connector 10 to the printed circuit board P. In FIG. 8, with the respective mount brackets 100 and 110 arranged in a position opposite to that in FIGS. 1 and 7, the card connector 10 and mount brackets 100 and 110 can be simply fixed to either the upper side or the lower side of the printed circuit board P by changing the mount direction of the small printed circuit board 20 and mount brackets 100 and 110.

As shown in FIG. 8, the one-paired mount brackets 100 mounted on the header 14 are wholly formed of a metal sheet and comprise a body section 102 and stand-off section 104 extending from the body section 102. Four retaining claws 106 are projected from the body section 102. Latch holes into which four retaining claws 106 are inserted are opened on the end face of the small printed circuit board 20 side of the respective header body 14a, the latch holes being formed in pairs, having substantially the same shape to each other and being mutually parallel to each other. The respective four retaining claws 106 and latch holes have mutually orthogonal symmetrical axes and the four retaining claws 106 and four latch holes can be brought to an engaged state either in the non-inverted position of the mount bracket 100 as shown in FIG. 7 or in an up/down inverted position of the mount bracket 100 as shown in FIG. 8.

The stand-off section 104 extends from the body section 102 and the forward end portion of the stand-off section 104 has a support plate section 108 bent on the same side as the retaining claws 106. A cylindrical projection 109 serving as a coupling section is projected from the support plate section 108 in a direction away from the body section 102. A female screw is formed in the cylindrical section 109 and any fastening means such as a mount screw 120 (FIG. 8(B)), inserted through the printed circuit board P, can be threadably inserted into the cylindrical projection 109. The cylindrical projection 109 having such a female screw serves as a fastening means or temporary fastening means when the card connector 10 is positioned relative to the printed circuit board P.

The two pairs of mount brackets 110 mounted on the arm sections 16 comprise a body section 112 formed of a metal sheet and a stand-off section 114 extending from the body section 112. Two tongues 113 are formed by bending the upper and lower edge sections of the body section 112 and the latch hole 116 extends through the respective tongue 113. Through the engagement of the latch hole 116 with the retaining claw 99 (see FIGS. 6 and 7) projecting from the upper and lower edge portions of the arm section 16, it is possible to prevent any movement of the mount bracket 110 in the longitudinal and lateral direction of the arm section 16. It is also possible to prevent any movement of the mount bracket in a height direction through the use of the tongues 113 for sandwiching the arm section 16 from between the upper and the lower side.

It is preferable that, as shown in FIG. 6(C), the retaining claw 99 be formed integral with a core member 90 made of a metal. The four tongues 113 and latch holes 116 have mutually orthogonal symmetric axes with respect to the four retaining claws 99. As a result, either in the non-inverted position of the two pairs of mount brackets as shown in FIG. 7 or in the up/down inverted position of the bracket 110 as shown in FIG. 8, it is possible to engage the four retaining claws with the four latch holes 116.

As in the case of the mount bracket 100, the two pairs of mount brackets 110 comprise a body section 112 and a stand-off section 114 extending from the body section 112, a support plate section 118 being formed by bending the forward end portion of the stand-off section 114. The support plate section 118 is bent on the same side as the tongues 113 and a cylindrical projection 119 serving as a coupling section with a female screw formed therein is projected in a direction away from the body section 112.

As shown in FIG. 7, the two pairs of mount brackets 110 can serve as guides for slidably retaining the push rod 50 in the recess 96 (FIG. 6(C)) of the arm section 16.

Figure 8B:
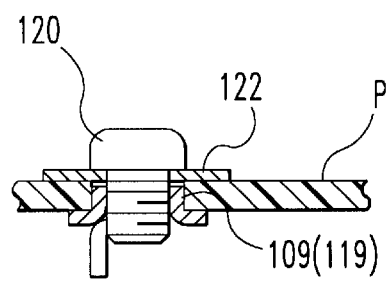

In the case where the mount brackets 100, 110 are mounted on the printed circuit board P, the cylindrical projections 109, 119 are inserted into the associated mount holes in the printed circuit board P as shown in FIG. 8(B) and the mount screw 120 (fastening means) inserted from the opposite side via a washer 122 is threadably inserted in the associated female screw in the cylindrical projection (109, 119). By making the mount hole of the printed circuit board P somewhat greater in diameter than the outer diameter of the cylindrical projection (109, 119) it is very easier to position the card connector 10 relative to the printed circuit board P.

In the case where the card connector 10 is mounted on the reverse side of the printed circuit board P, the respective mount brackets 100, 110 are mounted in a reversed state and the small printed circuit board 20 is also reversed. In accordance with the position of the cylindrical projection (109, 119), the corresponding screw hole position does not change in the insertion/withdrawal direction E of the PC card C as well as in the width direction of the PC card C, so that it is possible to mount the printed circuit board P on the reverse side, while keeping its PC card C in the same polarity. In this case, the small printed circuit board 20 is also reversed and the conductive pad 19 is connected to the corresponding header body 14a on the corresponding side.

Further, the respective mount bracket (100 and 110) has its support plate section (108, 118), that is, the support plate section with the female screw formed therein, fitted between the connector frame 18 and the printed circuit board P, so that the mount bracket does not extend outside the connector frame 18, that is, it takes up only a very small area on the printed circuit board P.

Although, in the above-mentioned embodiment, the female screw is formed in the inner wall of the cylindrical projection (109, 119), a male screw may be formed on the outer periphery of the cylindrical projection instead. In this case, the cylindrical projection (109, 119) may be of a solid structure and a mounting nut is used as a fastening means. In place of the mount screw 120 or mount nut, a rivet may be used as a fastening means in which case it is not necessary to form either the female or the male screw at the cylindrical projection (109, 119).

Figure 9:
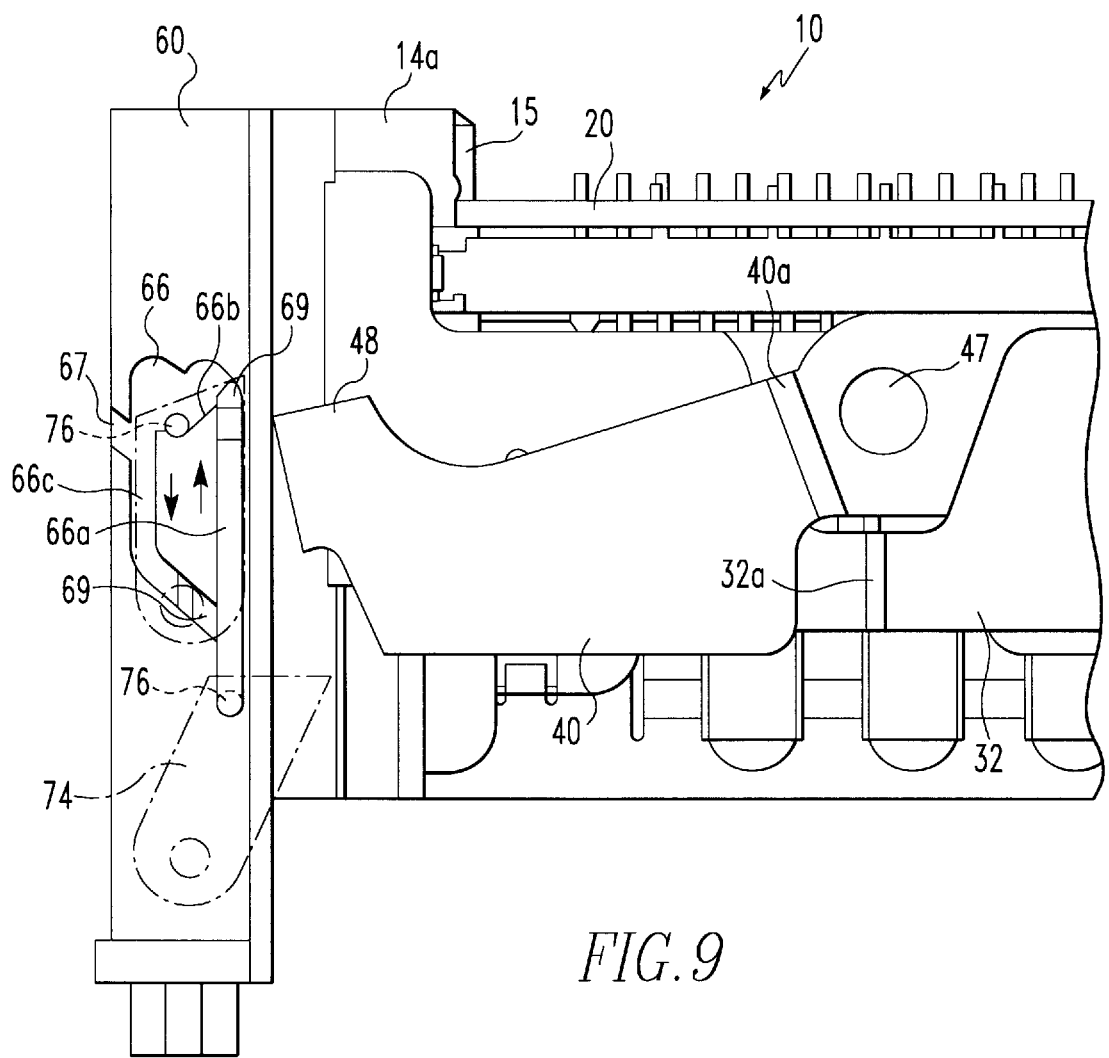
FIG. 9 is an explanatory-view showing an operation of a cam and actuator.

FIG. 9 shows the operation of the cam groove 66 and actuator member 74 upon withdrawal of the PC card out of the card connector 10 thus formed.

The cam groove 66 is formed as a continuous groove configuration, comprising a drive section 66a extending straight adjacent to the header body 14a, a latching section 66b situated on the small printed circuit board 20 side and a curved return section 66c extending from the latching section 66b toward the opposite side of the small printed circuit board 20. The cam follower pin 76 of the actuator 74 is moved in the cam groove 66, along an arrow direction, together with the movement of the push rod 50. An inclination section 69 is provided at a transition area from the drive section 66a to the latching section 66b and at a transition area from the return section 66c to the drive section 66a so as to prevent the pin from being moved in an opposite direction to the arrow direction. For this reason, the cam follower pin 76 is fully prevented from the drive section 66a to the return section 66c and from the latch section 66b to the drive section 66a.

The pin 76 of the actuator member 74 is situated normally at the latching section 66b and, in this state, the actuator member 74 is placed in a position where it is retracted back into the slider 70. And the push rod 50 is situated in a retained position. Since the actuator member 74 is situated in the position to be retracted back into the slider 70, the projection 48 of the link member 40 allows the link member 40 and ejecting plate 32 to be freely moved without interfering with the actuator member 74. When, therefore, the PC card C is inserted into the card connector 10, the PC card C enables the link member 40 to swing, while pressing the engaging section 36 of the ejecting plate 32, and sets in fitting contact with the terminal pins 12. At this time, the push rod 58 mounted on the outer end of the push rod 50 is maintained in an inwardly pushed-in state.

When the PC card C is to be withdrawn out of the card connector, the push button 58 is lightly pushed, allowing the pin 76 of the actuator member 74 to be pushed out of the latching section 66b and, under an urging force of the coil spring 56 acting on the push rod 50, the pin to be moved past the return section 66c to the outermost end (FIG. 9) of the drive section 66a. This state is as shown in FIG. 7 and the push button 58 is situated in a position largely extended in a direction away from the header section 14. And the actuator 74 has its forward end projected out of the opening 78a (FIG. 3) in the slider 70. If the push button 58 is push in this state, the pin 76 is guided along the drive section 66a of the cam groove 66 and moves the actuator member 74 while being projected toward the header body 14a side. By doing so, the projection 48 of the link member 40 is moved by the actuator member 74 and the link member swings about the support shaft section 47 to move the ejecting plate 32 outwardly. The PC card C has its inner end latched by the engaging sections 36 of the ejecting plate 32 and, together with the ejecting plate 32, is pushed outwardly. When the push rod is fully pushed to a pushed-in position, the engaging section 44 (FIG. 8) provided on the forward end of the link member 40 further pushes the PC card C outwardly after the PC card C has been disconnected away from the terminal pins 12.

When a push force on the push button 58 is released, the cam follower pin 76 is set at the latching section 66b under the urging force of the coil spring 56 and the actuator member 74 is retracted back into the slide 70. By doing so, the push rod 50 is held again at the retaining position. In this retaining position, the push button 58 is located somewhat more on an outer side than in a fully pushed-in position.

FIG. 10 shows another embodiment of the present embodiment. The same reference numerals are employed to designate parts or elements corresponding to those in the first-mentioned embodiment and any further explanation is, therefore, omitted.

In this embodiment, a cam groove 66 is provided in the side wall of the header body 14a. An actuator member 140 is slidably guided in the guide hole 152 in the inner end portion of the push rod 150. A cam follower pin 76 extends from the actuator member 140 into the cam groove 66 and is pushed by a leaf spring 144 against the bottom wall of the cam groove 66. A cylindrical forward end 142 of the actuator member 140 is moved between an extended position as shown in FIG. 10(B) and a retracted position (a position where it is retracted into a guide hole 152) by means of the cam groove 66 and cam follower pin 76. A projection 48 of a link member 40 can be freely moved in a slot 154 in the inner end portion of the push rod 152 when the actuator member 140 is retracted back into the guide hole 152.

As evident from the above, according to the card connector of the present invention, the actuator member in the push rod is operated by the cam provided at the header section and the ejecting plate is moved through the direct operation of the link member, so that the ejecting mechanism-equipped card connector, that is, a card connector capable of projecting the push button only when the PC card is withdrawn, can be manufactured as a simple and low-cost structure with a very high operation reliability.

Since the mount bracket, being set in the inverted position with the stand-off section in a corresponding position and in the non-inverted position, retains the respective coupling section in the same corresponding position along the width direction of the PC card and in the insertion/withdrawal direction, so that it is possible to very simply mount the card connector on any position of the printed circuit board.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A PC card connector equipped with an ejecting mechanism, comprising:

a header section having an array of terminal pins connected to a PC card;

an ejecting plate having engaging sections for engaging with the PC card and guided along an insertion/withdrawal direction of the PC card;

a link member having a coupling section so coupled to the ejecting plate as to be swingable, a support section swingably supported at the header section in a spaced-apart position from the coupling section, and a projection projecting toward the side of the header section;

a push rod having an inner end section disposed adjacent to the header section and an outer end section spaced apart from the header section and adapted to receive an urging force, whereby, when the outer end section is moved from an outwardly extended position spaced apart from the header section to an inwardly pushed-in position near to the header section, the ejecting plate is moved in a PC card withdrawal direction through the link member; urging means for urging the push rod toward the outwardly extended position; and an operation device whereby, when the push rod is moved from the extended position to the pushed-in position by the urging force from the outer end section, the ejecting plate is driven in the PC card withdrawal direction through the link member, when the urging force is released with the push rod set in the pushed-in position, the outer end section latches the push rod to a retained position somewhat more on an outer side than the pushed-in position, and, when the push rod set in the retained position receives the urging force through the outer end section, the push rod is unlatched so that the push rod is returned to the extended position, in which the operation device has a movable actuator member disposed at the inner end section of the push rod and a cam provided at the header section and adapted to operate the actuator member and the cam has a drive section for, when the push rod is moved from the extended position to the push-in position, projecting and guiding the actuator member to a projected position engageable with the projection of the link member, a latching section for, when the push rod is situated in the pushed-in position and the urging force is released, retracting the actuator member to a position not engageable with the projection to latch the actuator member and prevent the push rod from being returned to the extended position, and a return section for, when the push rod in the retained position receives the urging force through the outer end section, unlatching the actuator member to move and guide the actuator member to the retracted position.

2. The card connector according to claim 1, wherein the header section has a side projection situated on the projecting side of the link member's projection and providing the cam and a guide rail provided at the side projection and guiding the inner end section of the push rod along an insertion/withdrawal direction, the inner end section of the push rod has a hollow slider slidable along the guide rail and arranged in an superimposed relation to the Cam and the actuator member is mounted in the slider and projectable out of an opening in that side wall of the slider facing the header section.

3. The card connector according to claim 2, wherein the actuator member has a stopper latched by the slider and has its amount of projection out of the opening restricted by the stopper.

4. The card connector according to claim 2, wherein the push rod has an operation arm coupled to one end of the slider and an outer end of the operation arm receives the urging force.

5. The card connector according to claim 1, further comprising:

- a connector frame having the header section and a pair of opposed arm sections extending from both side ends of the header section and guiding the side edge of the PC card along an insertion/withdrawal direction of the PC card;

- a plurality of mount brackets, each, having a body section fitted over the connector frame, a stand-off section extending from the body section and retaining a predetermined distance between the connector frame and a printed circuit board, and a coupling section extending from the stand-off section into an opening of the printed circuit board and fastened by fastening means from an opposite side of the printed circuit board, and fixing the connector frame to the printed circuit board, wherein a latch hole is provided in one of the body of the mount bracket and connector frame and an associated retaining claw is provided on the other and, through the engagement of the retaining claw with the latch hole, the mount bracket fixes its body section to the connector frame, and

- in an inverted position of the mount bracket with the stand-off section set in a corresponding opposite side and in a non-inverted position, the coupling section is set in the same corresponding position along a width direction of the PC card and insertion/withdrawal direction of the PC card.

6. The card connector according to claim 5, wherein the arm sections are of mutually the same construction.

7. The card connector according to claim 1, wherein the cam is located in a plane substantially orthogonal to a plane in which the ejecting plate is moved and a drive section of the cam projects and guides the actuator member toward a direction substantially orthogonal to the insertion/withdrawal direction of the PC card.

8. The card connector according to claim 2, wherein the cam has a groove in the side projection and the actuator member has a cam follower pin guided along the groove and is spring-urged toward the side projection and the cam follower pin is set in contact with the bottom wall of the groove.

* * * * *

UNITED STATES PATENT AND TRADEMARK OFFICE
CERTIFICATE OF CORRECTION

| | | |
|---|---|---|
| PATENT NO. | : 5,871,365 | Page 1 of 1 |
| APPLICATION NO. | : 09/052299 | |
| DATED | : February 16, 1999 | |
| INVENTOR(S) | : Kajiura | |

It is certified that error appears in the above-identified patent and that said Letters Patent is hereby corrected as shown below:

On the title page insert the following:

-- (30)   Foreign Application Priority Data

April 18, 1997    (JP)................................................H9-101795 --

Signed and Sealed this

First Day of May, 2007

JON W. DUDAS
*Director of the United States Patent and Trademark Office*